Patented Sept. 8, 1936

2,053,610

UNITED STATES PATENT OFFICE 2,053,610

PROTECTING ANIMAL FIBERS FROM TEXTILE PESTS

Theodor Hermann, Frankfort-Hochst, Robert Seydel, Cologne-Dellbruck, and Walther Retter, Cologne-Deutz, Germany, assignors to I. G. Farbenindustrie Aktiengesellschaft, Frankfort-on-the-Main, Germany No Drawing. Application July 3, 1933, Serial No. 678,998. In Germany July 22, 1932

9 Claims. (Cl. 167—37)

The present invention relates to a process for protecting wool, fur and the like from moths and like textile pests and to agents and preparations therefor.

It is well known in the art that wool, fur, feathers and like materials, liable to attack by moth and like textile pests, can be protected therefrom by acting on the said materials with practically colorless, halogen-bearing hydroxy-di- or tri-aryl methane compounds. These compounds are generally applied to the goods either by spraying or by soaking them with solutions of the said compounds in water, in aqueous solutions or in one or more organic solvents.

We have now found that more valuable results can be obtained in several respects by employing one or more ethers of the said compounds in which all phenolic hydroxyl groups of the said compounds are etherified by alkyl groups, that is open chain alkyl, cycloalkyl or arylated alkyl groups.

The said compounds correspond to the general formula R—CHX—R in which R denotes aromatic, preferably benzene, nuclei which contain one or more halogen atoms and an alkoxy or aralkoxy group and X denotes hydrogen or an aromatic, preferably a benzene nucleus which may contain one or more halogen atoms or a sulphonic acid group or both. The said halogen atoms are preferably chlorine atoms, though bromine or iodine atoms may be present but compounds containing these latter are more expensive than those containing chlorine.

The said ether groups may be chosen, for example, from those of methyl, propyl, alkoxyalkyl (R—O—R—), allyl, n- and iso-butyl, cyclohexyl and benzyl ether groups. The compounds containing ether groups with from 3 to 5 carbon atoms, especially those containing butyl groups have proved most efficient, and, in most cases, the ether groups should be connected to R in the o-position to the methylene or methine groups. It is often sufficient that the nuclei R each contain but one halogen atom but in any case one halogen atom should be connected to the said nuclei in the m-position to the methylene or methine groups. The preferred basic compounds of the ethers are accordingly of the types of 2,2'-di-alkoxy-3,3'-chlor-diphenyl methane, 2,2'-di-alkoxy-5,5'-chlor-diphenyl methane and the corresponding tri-phenyl methane compounds in which the third phenyl radical (X) contains a neutralized sulfonic acid group.

The compounds employed according to the present invention may be prepared by condensing one molecular proportion of an aldehyde, such as formaldehyde, acetaldehyde, benzaldehyde or a sulphonic acid of an aromatic aldehyde, as for example a benzaldehyde sulphonic acid, with two molecular proportions of an alkyl-, cycloalkyl- or aralkyl ether of a phenol or naphthol or of mixtures of such ethers. The condensation is carried out in the manner usual for the production of such compounds, that is with the aid of an acid condensing agent, such as concentrated sulphuric acid, or a mixture thereof with acetic acid or zinc chloride. Even on employing single ethers in the condensation, mixtures of different di- or tri-aryl methane compounds are often formed in which the methylene radical, or methine radical respectively, is connected to different positions of the nuclei of the phenol or naphthol ethers.

It is therefore preferred first to condense the aldehyde substance chosen with a suitable phenol or naphthol containing free phenolic hydroxyl groups and then to alkylate, or aralkylate respectively, all the phenolic hydroxyl groups of the resulting di- or tri-aryl methane compound in any usual and convenient manner, for example, with the aid of alkyl halides or alkyl sulphates. Since the condensation of the aldehyde substances with the phenols or naphthols generally furnishes uniform products as well as the subsequent alkylation or aralkylation more uniform products are thus obtained than by the condensation of the aldehyde substances with ethers of the phenols or naphthols.

Depending on their solubility the compounds may be applied in the form of aqueous solutions or dissolved in organic solvents. If they are intended for use in aqueous baths, for example in a joint dyeing and moth proofing process, the benzene nucleus defined by X should contain a sulphonic group, preferably neutralized by an alkali metal, such as sodium or potassium, or by ammonia. The acid compounds go on the organic fibers of wool and the like and are only difficultly removed therefrom. In comparison to the results obtainable with the hitherto known compounds, the goods treated with the ethers according to the present invention show more lasting moth proofed properties after washing and an increased fastness to light.

As mentioned above, compounds having a different length of the alkoxy and aralkoxy chains give slightly different results. Hence, the quantities applied of the different compounds are varied according to their efficacy from about 1 to about 3 per cent by weight of the goods being sufficient in many cases.

The following examples will further illustrate the nature of this invention, which is, however, not restricted to these specific examples. The parts are by weight.

*Example 1.*—100 kilograms of woolen yarn are worked at about 60° C. in about 2 cubic metres of an aqueous bath containing 840 grams of alizarine direct blue, 260 grams of supramine yellow R, 220 grams of supramine red GG, 3 kilograms of 3.3'.5.5'.4'' - pentachlor - 6.6' - dimethoxy-triphenyl methane-2''-sulphonic acid sodium salt, 10 kilograms of Glauber's salt and 4 kilograms of sulphuric acid. The yarn thus treated is dyed and protected against attack by moth and other textile pests.

In the place of the said tri-phenyl methane sulphonic acid salt the sodium, potassium or ammonium salts of the following compounds may be employed in the same way:

2.2' - dimethoxy.3.5.3'5'tetrachlor - tri-phenylmethane-2''sulphonic acid.

2.2' - diethoxy.3.5.3'5'tetrachlor - tri - phenyl - methane-2''sulphonic acid.

2.2'-di-(n- or iso-) propyloxy-3.5.3'5'tetrachlor-tri-phenylmethane-2''sulphonic acid.

2.2' - di - n - buthoxy - 3.5.3'5'tetrachlor - tri - phenylmethane-2''sulphonic acid.

2.2' - di - iso - buthoxy - 3.5.3'5'tetrachlor - triphenylmethane-2''sulphonic acid.

2.2' - di - iso - amyloxy - 3.5.3'5'tetrachlor - triphenylmethane-2''sulphonic acid.

2.2'-di-allyloxy - 3.5.3'5'tetrachlor-tri-phenyl - methane-2''sulphonic acid.

2.2'-di-cyclohexyloxy - 3.5.3'5'tetrachlor - triphenylmethane-2''sulphonic acid.

2.2'-di-methoxy - 3.5.3'5'tetrachlor-tri-phenylmethane-4''sulphonic acid.

2.2'-di-methoxy-3.3'-dimethyl - 5.5'dichlor-triphenylmethane-4''sulphonic acid.

2.2' - di - ethoxy - 3.5.3'5'4'' - pentachlor - tri - phenylmethane-6''sulphonic acid.

2.2'-di-n-buthoxy - 3.5.3'5'4''-pentachlor - triphenylmethane-6''-sulphonic acid.

Di-cyclohexyloxy - 3.5.3'5'4''-pentachlor - triphenylmethane-6''-sulphonic acid.

Di-cyclohexyloxy - 3.5.3'5'4''-pentachlor - triphenylmethane-6''-sulphonic acid.

Di - benzyloxy - 3.5.3'5'4'' - pentachlor - tri - phenylmethane-6''-sulphonic acid.

2.2'-di-methoxy-3.5.3'5'-tetrachlor-4''-bromo-tri-phenylmethane-6''-sulphonic acid.

2.2'-di-methoxy - 3.5.3'5'3'' - pentachlor - triphenylmethane-6''-sulphonic acid.

2.2'-di-n-buthoxy - 3.5.3'5'3''-pentachlor - triphenylmethane-6''-sulphonic acid.

2.2' - di - methoxy - 5.5'3''-trichlor-tri-phenyl - methane-6''sulfonic acid.

2.2'-di-n-buthoxy-3.3'-dimethyl.5.5'3''trichlor-tri-phenylmethane-6''-sulphonic acid.

2.3'-di-n-buthoxy - 3.5.2'4'6'-pentachlor - tri - phenylmethane-4''-sulphonic acid.

*Example 2.*—Woolen piece goods are worked in an about 10 per cent solution in a mixture of 1 part by weight of cyclohexanone and 5 parts of benzine of 2.2' - di-n-buthoxy - 5.5'-dichlor - diphenyl methane and then centrifuged so far that the goods, after drying, contain from 2 to 3 per cent by weight of the said di-phenyl methane compound. The goods are thus rendered mothproof.

Instead of working the goods in the solution they may be sprayed therewith.

In the place of the said di-phenyl methane compound 2.2'-di-n-buthoxy - 3.3'5.5'4'' - pentachlor-tri-phenyl methane or 2.2'-di-n-buthoxy-3.3'.5.5'.5''.2''.4''-heptachlor-tri-phenyl methane may be employed.

The following examples show suitable methods for the production of the compounds employed according to the foregoing examples.

*Example 3.*—20.8 parts of the sodium salt of benzaldehyde-o-sulphonic acid and 28.5 parts of p-chlor-anisol are introduced into 200 parts of concentrated sulphuric acid of 87 per cent strength whereupon the whole is stirred for about 12 hours at from about 40° to about 45° C. The condensation product separates out in the form of a crystal powder. As soon as traces only of the initial materials can be detected, the sulphuric acid solution is diluted with water to a strength of about 40 per cent. The condensation product is filtered off and mixed with a quantity of an aqueous solution of sodium carbonate sufficient to render the mixture slightly acid to Congo. By introducing steam remaining traces of chloranisol are driven off. By adding sodium sulphate, crystals of the sodium salt of the condensation product separate out. The sodium salt is rather easily soluble in cold water and easily soluble in hot water. By adding ferric chloride to an aqueous solution of the salt a colourless precipitate separates out which gives a colourless solution with ethyl ether. White precipitates also separate out by adding salts of aluminium or calcium.

The conditions of the condensation, that is the concentration of the sulphuric acid, the temperature and the reaction period may be varied in rather wide limits and other suitable condensing agents may be employed, as for example, sulphuric acid diluted with acetic acid.

The p-chlor-anisol may be replaced by 2.4-dichlor-anisol, 2-methyl-4-chlor-anisol, ethers of phenols and ethers of naphthols with higher aliphatic or cycloaliphatic alcohols, such as hexylalcohol or cyclohexanol or with benzyl alcohols, such as benzyl alcohol or p-chlor-benzyl alcohol.

*Example 4.*—26 parts of the sodium salt of benzaldehyde-p-sulphonic acid are dissolved in a mixture of 75 parts of glacial acetic acid and 60 parts of a 100 per cent sulphuric acid. While excluding air, 30 parts of anisol are added at from 5° to 10° C., whereupon the whole is stirred for about 24 hours at this temperature and subsequently for about 3 hours at 30° C. until traces only of the initial material can be detected.

The reaction mixture is then passed into about 200 parts of a mixture of ice and water, whereupon sodium carbonate or caustic soda are added in such a quantity that the mixture reacts only slightly acid to Congo. After removing any traces of anisol by blowing through steam, the reaction product is salted out with the aid of common salt. The resulting colourless resinous product can be powdered after drying and is easily soluble even in cold water, difficultly soluble precipitates being formed by adding ferric salts or aluminium salts to the solutions.

*Example 5.*—51.6 parts of the sodium salt of 2.2' - di - hydroxy -3.3'.5.5' - tetrachlor-tri-phenyl methane-2''-sulphonic acid, obtainable by a condensation of one molecular proportion of benzaldehyde-o-sulphonic acid with two molecular proportions of 2,4-dichlor-phenol are dissolved in 400 parts of a 2 per cent aqueous solution of caustic soda, whereupon the whole is stirred for several hours at from about 25° to about 50° C. with about 26 parts of dimethyl sulphate until the initial materials have disappeared practically completely, the reaction mixture being continuously kept slightly alkaline, if necessary by adding a little sodium carbonate. The resulting pulp of fine crystals is filtered off by suction after cooling and is washed with water. By redissolution in hot water and adding sodium sulphate the product is obtained in the form of silvery leaflets; by adding ferric chloride or aluminium sulphate to aqueous solutions thereof difficultly soluble white precipitates are formed.

The reaction proceeds according to the equation:

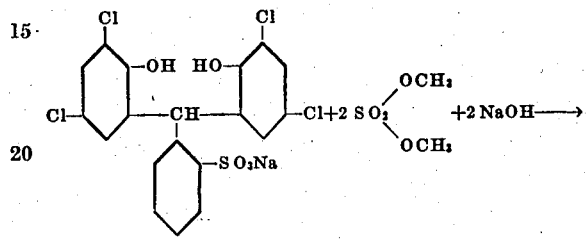

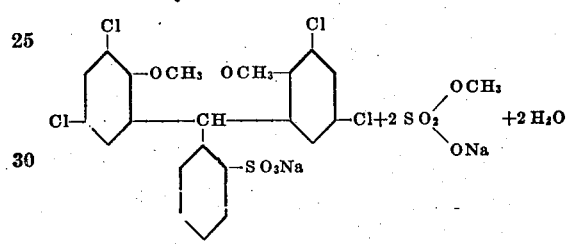

The methylation may also be carried out according to any other suitable known method, for example, with the aid of other alkaline or other alkylating agents so that n-butyl, iso-butyl or cyclo-hexyl ether groups may be connected with the benzene nuclei. Instead of the aforesaid tri-phenyl methane sulphonic acid salt, the salt of the tri-phenyl methane sulphonic acid one molecular proportion of benzaldehyde-o-sulphonic acid and two molecular proportions of 2-methyl-4-chlorphenol may be employed as well as the tri-phenyl methane sulphonic acid salt from one molecular proportion of 3-chlor-benzaldehyde-6-sulphonic acid and two molecular proportions of 2.4-di-chlor-phenol.

*Example 6.*—82 parts of 3.3'.5.5'-tetrachlor-4.4'-dihydroxy-triphenyl methane-2''-sulphonic acid sodium salt, obtainable from one molecular proportion of benzaldehyde-o-sulphonic acid and two molecular proportions of 2.6-di-chlor-phenol are dissolved in an aqueous caustic soda solution and warmed with dimethyl sulphate to 95° C. in the manner described in Example 5. The product is worked up as described, the crystals obtained corresponding to the formula:

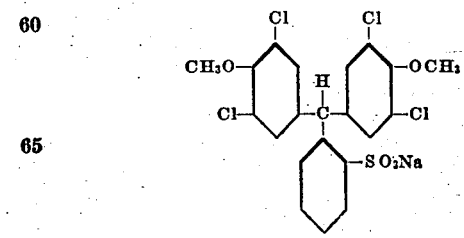

*Example 7.*—51.6 parts of the sodium salt of the di-hydroxy-tri-phenyl methane sulphonic acid referred to in the beginning of Example 5 are dissolved in 400 parts of a 2 per cent aqueous caustic soda solution; 26 parts of benzyl chloride are added and the mixture is then heated to boiling until the initial materials have disappeared, the reaction mixture being continuously kept slightly alkaline, if necessary by adding sodium carbonate. Traces of volatile substances are then removed by blowing through steam and solid substances by filtration, whereupon the sodium salt of the sulphonic acid

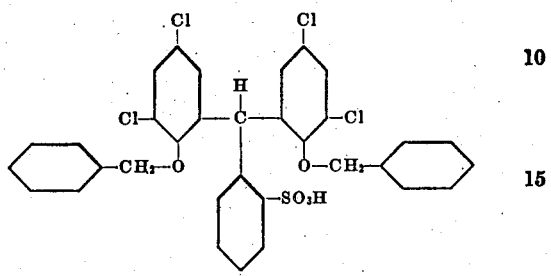

is salted out in the form of crystals by adding sodium sulphate.

*Example 8.*—51.6 parts of the sodium salt of the di-hydroxy-tri-phenyl methane sulphonic acid referred to in the beginning of Example 5 are dissolved in a solution of 8 parts of caustic soda in 300 parts of water, the solution being then mixed in an autoclave with 37.4 parts of iso-propyl iodide and the autoclave being then warmed for 48 hours in an oil bath heated to from 100 to 115° C. After cooling, the oil separated out is separated from the aqueous layer and distilled with steam. From the aqueous solution a crystalline sodium salt corresponding to the formula:

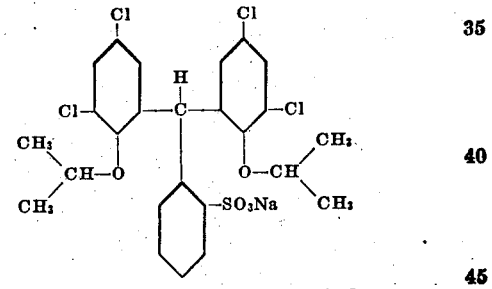

is precipitated by adding a concentrated aqueous caustic soda solution or sodium sulphate.

In the same manner n-propyl bromide or allyl iodide may be employed for the etherification.

*Example 9.*—51.6 parts of the sodium salt of the di-hydroxy-tri-phenyl methane sulphonic acid referred to in the beginning of Example 5 are dissolved in a mixture of 29.6 parts of an aqueous 32.4 per cent caustic soda solution and 150 parts of water, the solution being then mixed with 30.14 parts of iso-butyl-bromide and heated to boiling under reflux for 24 hours. A coarse crystalline precipitate, presumably consisting of the iso-butyl-sulphonic acid ester of the di-iso-butyl ether, is filtered off while the solution is still hot. After blowing with steam and adding a concentrated aqueous caustic soda solution, the sodium salt corresponding to the formula:

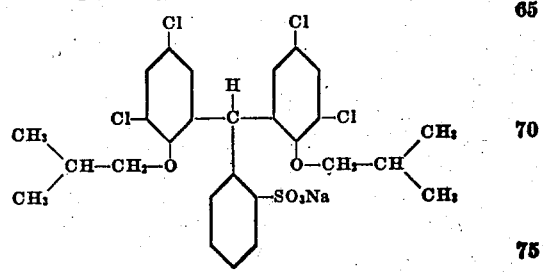

separates out as an oily layer which solidifies to a crystalline mass on cooling.

*Example 10.*—25 parts of the sodium salt of 2.2'-di-hydroxy-3.3'.3".5.5'-pentachlor-tri-phenyl methane-6"-sulphonic acid (obtainable from one molecular proportion of 3-chlor-benzaldehyde-6-sulphonic acid and 2 molecular proportions of 2.4-di-chlor-phenol) are dissolved in 15 parts of an aqueous 31 per cent caustic soda solution and 100 parts of water whereupon, while vigorously stirring, 18 parts of n-butyl-bromide are added at from 95 to 100° C. As soon as the latter has disappeared after some heating, the reaction mixture is cooled, the resulting resinous product is separated, dissolved in hot water and the solution blown with steam. By adding sodium sulphate to the solution the sodium salt corresponding to the formula:

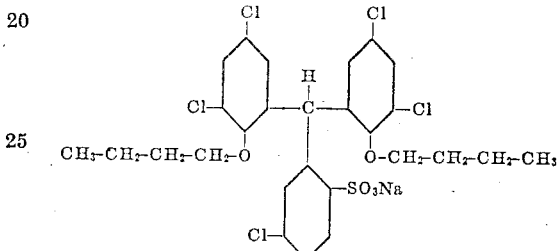

is precipitated in the form of a powder.

In a similar manner the initial sulphonic acid salt may be alkylated with the methyl ether of ethylene glycol chlor-hydrin or n-butyl-chloride may be reacted with the sulphonic acid salts from one molecular proportion of benzaldehyde-2.4-di-sulphonic acid and two molecular proportions of 2.4-di-chlor-phenol or from one molecular proportion of benzaldehyde-p-sulphonic acid and one molecular proportion each of 2.4.6-tri-chlor-phenol and of 2.4-di-chlor-phenol.

We claim:

1. Compounds suitable for protecting animal fibers from textile pests and corresponding to the formula R—CHX—R in which R denotes aromatic nuclei, containing at least one halogen atom and an etherified phenolic hydroxyl group, and X denotes hydrogen or an aromatic nucleus, any phenolic hydroxyl groups in said compounds being etherified by alkyl groups.

2. Compounds suitable for protecting animal fibers from textile pests and corresponding to the formula R—CHX—R in which R denotes aromatic nuclei, containing at least one halogen atom and an etherified phenolic hydroxyl group, and X denotes hydrogen or an aromatic nucleus containing a sulphonic acid group, any phenolic hydroxyl groups in said compounds etherified by alkyl groups.

3. Compounds suitable for protecting animal fibers from textile pests and corresponding to the formula R—CHX—R in which R denotes aromatic nuclei, containing at least one halogen atom and an etherified phenolic hydroxyl group, and X denotes hydrogen or an aromatic nucleus containing an alkali-neutralized sulphonic acid group, any phenolic hydroxyl groups in said compounds being etherified by alkyl groups.

4. Compounds suitable for protecting animal fibers from textile pests and corresponding to the formula R—CHX—R in which R denotes benzene nuclei, containing at least one chlorine atom and an etherified phenolic hydroxyl group, and X denotes hydrogen or a benzene nucleus, any phenolic hydroxyl groups in said compounds being etherified by alkyl groups.

5. Compounds suitable for protecting animal fibers from textile pests and corresponding to the formula R—CHX—R in which R denotes benzene nuclei, containing at least one chlorine atom and an etherified phenolic hydroxyl group, and X denotes hydrogen or a benzene nucleus containing a sulfonic acid group, any phenolic hydroxyl groups in said compounds being etherified by alkyl groups.

6. Compounds suitable for protecting animal fibers from textile pests and corresponding to the formula R—CHX—R in which R denotes benzene nuclei, containing at least one chlorine atom connected to R in m-position to the CHX group, and an etherified phenolic hydroxyl group, and X denotes hydrogen or a benzene nucleus, any phenolic hydroxyl groups in said compounds being etherified by alkyl groups.

7. Compounds suitable for protecting animal fibers from textile pests and corresponding to the formula R—CHX—R in which R denotes benzene nuclei, containing at least one chlorine atom connected to R in m-position to the CHX group and an etherified phenolic hydroxyl group in o-position to the CHX group, and X denotes hydrogen or a benzene nucleus, any phenolic hydroxyl groups in said compounds being etherified by alkyl groups.

8. Compounds suitable for protecting animal fibers from textile pests and corresponding to the formula R—CHX—R in which R denotes benzene nuclei, containing a plurality of chlorine atoms, at least one of which is connected to R in m-position to the CHX group, and an etherified phenolic hydroxyl group in o-position to the CHX group, and X denotes hydrogen or a benzene nucleus, any phenolic hydroxyl groups in said compounds being etherified by alkyl groups.

9. Moth-proof animal fibers the superficial layer of which is combined with at least one compound corresponding to the formula R—CHX—R in which R denotes aromatic nuclei, containing at least one halogen atom and an etherified phenolic hydroxyl group, and X denotes hydrogen or an aromatic nucleus, any phenolic hydroxyl groups in said compounds being etherified by alkyl groups.

THEODOR HERMANN.
ROBERT SEYDEL.
WALTHER RETTER.